United States Patent
Aurell

[11] Patent Number: 5,533,706
[45] Date of Patent: Jul. 9, 1996

[54] VALVE ARRANGEMENT

[75] Inventor: Eskil Aurell, Växjö, Sweden

[73] Assignee: ABB Flakt AB, Nacka, Sweden

[21] Appl. No.: 178,266

[22] PCT Filed: Jun. 23, 1992

[86] PCT No.: PCT/SE92/00453

§ 371 Date: Feb. 10, 1994

§ 102(e) Date: Feb. 10, 1994

[87] PCT Pub. No.: WO93/01433

PCT Pub. Date: Jan. 21, 1993

[30] Foreign Application Priority Data

Jul. 4, 1991 [SE] Sweden .................. 9102082

[51] Int. Cl.$^6$ .............................. F16K 31/122
[52] U.S. Cl. .................... 251/44; 55/302; 251/30.05; 251/61.1
[58] Field of Search ............... 251/36, 44, 45, 251/46, 61.1, 30.01, 30.02, 30.05; 55/302; 137/544, 545, 549, 550; 210/429

[56] References Cited

U.S. PATENT DOCUMENTS

| 229,503 | 6/1880 | Walker | 251/44 |
|---|---|---|---|
| 295,691 | 3/1884 | Tobey | 251/44 |
| 871,859 | 11/1907 | Brooks | 251/36 |
| 926,400 | 6/1909 | Freaney | 251/44 |
| 1,146,011 | 7/1915 | Mason | 251/44 |
| 1,146,012 | 7/1915 | Mason | 251/44 |
| 1,548,093 | 8/1925 | McCormick | 251/44 |
| 2,037,540 | 4/1936 | Rohlin et al. | 251/36 |
| 2,047,120 | 7/1936 | Stout | 251/44 |
| 3,061,264 | 10/1962 | Rupert | 251/30.05 |
| 3,306,570 | 2/1967 | Cooksley | 251/30.05 |
| 4,033,732 | 7/1977 | Axelsson et al. | 251/61.1 |
| 4,190,230 | 2/1980 | Geissbühler | 251/36 |
| 4,251,048 | 2/1981 | Aurell | 251/46 |
| 4,309,021 | 1/1982 | Hafele | 251/36 |
| 4,913,397 | 4/1990 | Bronnert | 251/61.1 |
| 5,090,659 | 2/1992 | Bronnert | 251/61.1 |

FOREIGN PATENT DOCUMENTS

| 0004526 | 10/1979 | European Pat. Off. . |
|---|---|---|
| 466362 | 2/1992 | Sweden . |

Primary Examiner—George L. Walton
Attorney, Agent, or Firm—Burns, Doane, Swecker & Mathis

[57] ABSTRACT

A valve arrangement includes a valve housing having a circular cylindrical portion in which is formed a valve chamber, a control valve and a valve member. The valve chamber has an inlet adapted to be connected to a pressure-medium source for allowing pressure-medium to flow into the valve chamber and an outlet through which pressure-medium flows out of the valve chamber. The control valve is movable between a closed position in which the outlet of the valve chamber is closed and an open position in which the outlet of the valve chamber is open. The valve member is freely displaceable within the circular cylindrical portion of the valve housing based on the pressure within the valve chamber. The valve member includes a piston which is movable between a closing position in which the piston is adapted to prevent the flow of pressure-medium and an opening position in which the piston is adapted to permit the flow of pressure-medium. The inlet of the valve chamber is defined by an annular gap formed between the piston and the circular cylindrical portion of the valve housing.

13 Claims, 2 Drawing Sheets

VALVE ARRANGEMENT

FIELD OF THE INVENTION

The present invention relates to a valve. More particularly, the present invention pertains to a valve arrangement having a valve housing with a valve chamber formed therein, which has an outlet and an inlet which is adapted to be connected to a pressure-medium source; a control valve adapted, when in closed position, to close the outlet of the valve chamber and, when in open position, to open it; and a main valve having a valve member which is displaceable in the valve chamber and, depending on the pressure in the valve chamber, is shiftable between an outer closing position and inner opening position.

BACKGROUND OF THE INVENTION

A known valve arrangement of this type is used for connecting compressed-air pulses to beg-shaped filter elements in a filtering plant for cleaning polluted gases. The compressed-air pulses are connected to the interior of the bag-shaped filter elements for cleaning these elements by striking or shaking loose dust which, in the cleaning of polluted gases, has attached to the walls of the filter elements. The valve arrangement is then mounted on a compressed-air tank. The wall of the compressed-air tank is formed with a through hole, via which the valve member of the main valve, when in closing position, extends into sealing engagement against a valve seat arranged in the compressed-air tank at one end of a pressure tube. This tube extends out from the compressed-air tank in order, when the valve member is temporarily moved to its inner opening position, to connect a compressed-air pulse to the interior of the filter element.

In this prior-art valve arrangement, the main valve has a circular membrane clamped between the valve housing and the wall of the compressed-air tank an covering the hole in the tank wall. The valve member is fixed on the outside of the membrane. It is surrounded by an annular membrane portion which has overflow through holes forming the inlet of the valve chamber and providing a connection between the compressed-air tank and the valve chamber. In the known valve arrangement, the outlet of the valve chamber consists of an annular gap which opens at the outside of the valve housing. This gap is closed when the control valve is in its closed position, and open when the control valve is in its open position.

When the valve member of the main valve is in its closing position, it is maintained in engagement against the valve seat by the pressure prevailing in the valve chamber, which via the overflow holes in the membrane communicates with the compressed-air tank. Thus, the pressure in the valve chamber is the same as in the compressed-air tank, but since this pressure acts on a larger surface than does the pressure in the compressed-air tank, the membrane will be pressed out from the valve chamber, such that the valve member is urged towards its closing position.

When the control valve is opened, the air in the valve chamber flows out through the annular gap, and the pressure in the valve chamber drops, such that the pressure in the compressed-air tank urges the membrane into the valve chamber so as to open the main valve by moving the valve member to its inner opening position. When the control valve is closed shortly afterwards, the pressure in the valve chamber is again built up via the overflow holes in the membrane, whereby the main valve is closed by the valve member moving to its closing position.

In the known valve arrangement, the valve member is made of plastic and fixed to the outside of the membrane by means of a fixing bolt which extends through a plastic washer arranged at the inside of the membrane, through the membrane in its center and through the valve member, and on which a nut is screwed. Thus, the main valve is quite complex in that it consists of many parts. Moreover, the fixing bolt and the nut are liable to corrode in the environment where the filter element and, hence, the valve arrangement are used. As a result of corrosion, the fixing bolt, the valve member and the plastic washer will easily come loose when subjected to vibrations. Also, the membrane is difficult to clamp between the valve housing and the wall of the compressed-air tank, since this mounting must be accurately adjusted to the stroke length of the membrane, that is the distance up to the valve seat on the pressure tube. The known valve arrangement also suffers from the drawback of the membrane easily breaking at the overflow holes.

OBJECT AND SUMMARY OF THE INVENTION

The object of the present invention is to provide a new valve arrangement in which the main valve is of a considerably simpler design than the main valve of the known valve arrangement, has high corrosion stability, and is devoid of fracture areas in the form of overflow holes.

According to the present invention, this object is achieved by means of a valve arrangement which is of the type stated by way of introduction and which is characterised in that the valve body consists of a piston freely displaceable in a circular-cylindrical portion of the valve housing, and that the inlet of the valve chamber consists of an annular gap between the piston and the circular-cylindrical portion of the valve housing.

The circular-cylindrical portion of the valve housing preferably extends so far in the axial direction of the piston as to surround at least the major portion of and preferably the entire piston, seen in the axial direction thereof, also when the piston is in its closing position. Pressure-medium ports are suitably formed in the wall of the circular-cylindrical portion at the free end of this wall.

BRIEF DESCRIPTION OF THE DRAWING FIGURES

A preferred embodiment of the invention will now be described in more detail with reference to the accompanying drawings.

DETAILED DESCRIPTION OF THE INVENTION

Figure 1:
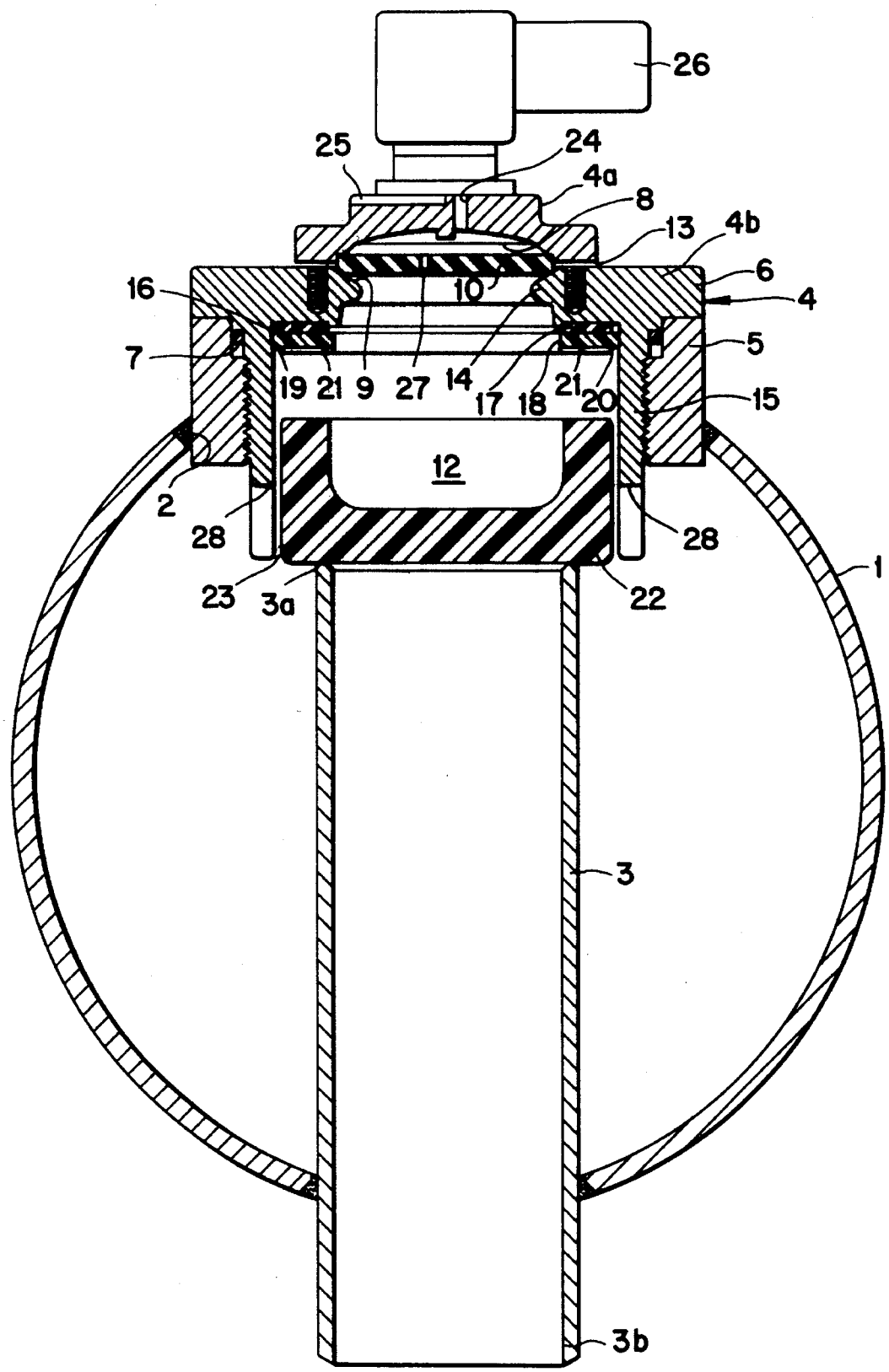
FIG. 1 is a sectional view showing a valve arrangement according to the present invention in the closed position.
Figure 2:
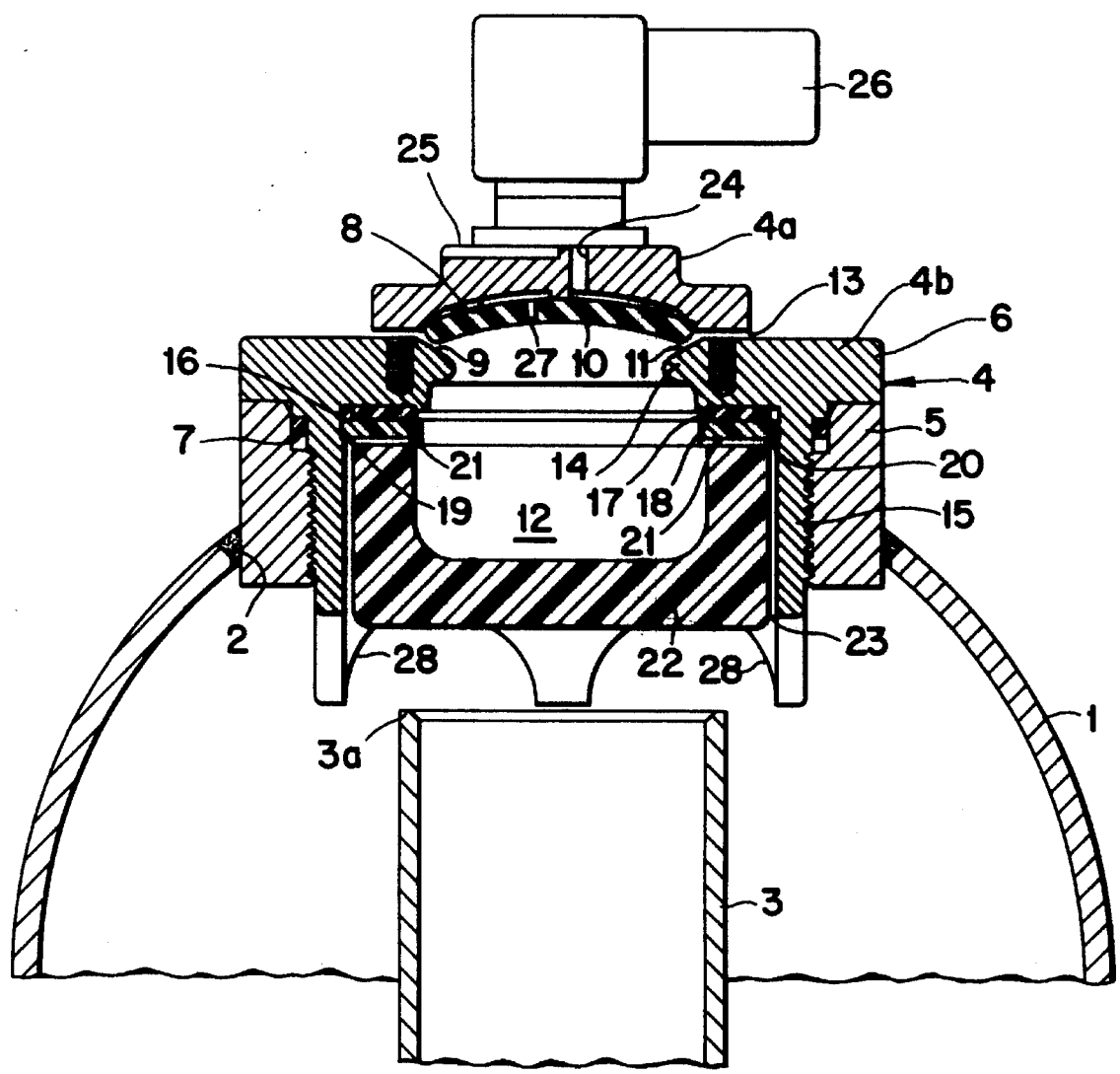
FIG. 2 is a sectional view showing the valve arrangement in the open position.

The valve arrangement shown in FIGS. 1 and 2 is used for connecting compressed-air pulses to vertically arranged, bag-shaped filter elements (not shown) in a filtering plant for cleaning polluted gases. The valve arrangement is mounted on a pressure-medium tank 1 over a circular hole 2 provided in the upper wall of the tank. The tank 1 here is a compressed-air tank.

A vertical pressure tube 3, which is coaxial with the hole 2, extends through the lower wall of the compressed-air tank 1 into the tank and opens at a certain distance below the hole 2. The upper end of the pressure tube 3 forms a valve seat 3a, and its lower end 3b opens outside the tank 1 to be connected to the openings of the bag-shaped filter elements.

The valve arrangement has a valve housing 4 of aluminium, which consists of two circular, coaxial parts, namely an upper part 4a and a tubular, externally threaded lower part 4b, which are screwed together with intermediate spacer members (not shown). An internally threaded pipe socket 5, in which the lower part 4b is screwed, is welded in the hole 2. The lower part 4b has an annular upper flange 6 engaging the upper end of the pipe socket 5, when the lower part is screwed completely into the pipe socket. A sealing ring 7 is provided between the lower part 4b and the pipe socket 5.

The upper part 4a has a cup-shaped, circular recess 8 at its underside, and the lower part 4b has a cup-shaped, circular recess 9 at its upper side. A flat circular plate or disc 10 of flexible material, such as silicone rubber, is disposed between the two parts 4a and 4b in annular, sealing engagement against the walls of the two recesses 8 and 9 (FIG. 1). The disc 10 can be bent upwards into the position shown in FIG. 2, in which its sealing engagement with the wall of the recess 9 has been suspended and an annular communication 11 has been established between the interior of the lower part 4b, this interior constituting the valve chamber 12 of the valve housing 4, and the annular gap 13 provided by the spacer members between the two parts 4a and 4b. The gap 13 communicates with the exterior of the valve housing 4.

The tubular lower part 4b has an upper portion 14, in which the recess 9 is formed, and a circular-cylindrical lower portion 15 having a larger inner diameter than the upper portion 14. An annular abutment 16 is formed between the two portions 14 and 15 of the lower part 4b. A rubber washer 17 engages the abutment 16 and is kept in place by means of a plastic washer 18 snapped into an annular groove 19 in the inner wall of the portion 15. This snap engagement is obtained by means of an annular groove 20 formed in the underside of the plastic washer 18 adjacent its periphery. A plurality of radial grooves 21 are also formed in the underside of the plastic washer 18.

A valve member in the form of a circular-cylindrical piston 22, having a substantially U-shaped longitudinal section, is disposed in the lower portion 15. The piston 22 is made of a glass-fibre-reinforced plastic and thus has good thermal and corrosion resistance. The outer diameter of the piston 22 is slightly smaller than the inner diameter of the lower portion 15, so as to provide an annular gap 23 between the piston 22 and the inner wall of the lower portion 15. The gap 23, which for greater clarity is shown with an exaggerated width in the drawings, provides a continuous communication between the interior of the pressure tank 1 and the valve chamber 12, and forms the inlet of the valve chamber. The piston 22 constitutes the main valve of the valve arrangement and is freely displaceable between an outer closing position, in which it sealingly engages the valve seat 3a of the pressure tube 3 (FIG. 1), and an inner opening position (FIG. 2), in which it is lifted off the valve seat 3a and in which it engages with its upper end the plastic washer 18, forming together with the rubber washer 17 a damping unit.

The upper part 4a has an axially oriented through bore 24 constituting an outlet from the recess 8. The upper part 4a has a radial groove 25 in its upper side. A solenoid valve 26, illustrated only schematically, is mounted on the upper part 4a in the order, when in open position, to establish a communication between the bore 24 and the groove 25 and, when in the closed position, to obstruct this communication. In the closed position of the valve arrangement (FIG. 1), the solenoid valve 26 is in the closed position. The disc 10 has an overflow through hole 27 which provides a communication between the recess 8 and the valve chamber 12. The disc 10 and the solenoid valve 26 together form the control valve of the valve arrangement.

When the valve arrangement is to be opened from the closed position shown in FIG. 1, to connect a compressed-air pulse of short duration to the bag-shaped filter elements via the pressure tube 3, the solenoid valve 26 is opened so as to establish a communication between the recess 8 and the ambient atmosphere. The disc 10 is then bent into the position shown in FIG. 2. As a result, the outlet, formed of the communication 11 and the gap 13, of the valve chamber 12, is then opened (FIG. 2). The pressure in the valve chamber 12 is thereby reduced, such that the main valve is opened by the piston 22, forming the valve member, being moved to the position shown in FIG. 2, in which it engages the damping unit, consisting of the rubber washer 17 and the plastic washer 18, and in which the top opening of the pressure tube 3 has been exposed.

When the valve arrangement is to be closed from the open position shown in FIG. 2, the solenoid valve 26 is closed, such that a pressure is built up in the recess 8 via the hole 27 in the disc 10. The disc 10 is then returned to its flat position (FIG. 1), in which the outlet 11, 13 of the valve chamber 12 is closed. Through the gap 23 and the radial grooves 21 in the underside of the plastic washer 18, the pressure is then again built up in the valve chamber 12, such that the main valve is closed.

As appears from the drawing, the circular-cylindrical lower portion 15 extends as far down as the upper end of the pressure tube 3, so that the entire piston 22, as seen in its axial direction, is surrounded by the portion 15 when the piston is in its closing position. As a result, the piston 22 will be accurately guided during its entire displacement, thus obviating the risk of jamming. At its lower end, the portion 15 has a plurality of recesses 28 which prevent undesired throttling of the compressed air flow from the pressure tank 1 to the pressure tube 3 when the main valve is opened.

What is claimed is:

1. Valve arrangement mounted within a hole provided in an air tank containing compressed air to clean filtering elements cooperatively associated therewith, the air tank having an interior into which extends a pressure tube having one end positioned in the interior of the air tank to define a valve seat and an opposite end in communication with the filtering elements, the valve arrangement comprising a valve housing having a circular cylindrical portion in which is formed a valve chamber that extends through said hold and into said tank, said valve housing having a control valve seating surface, said valve chamber having an outlet through which compressed air flows out of the valve chamber, said control valve housing including a control valve movable between an open position in which the control valve is spaced from the control valve seating surface to allow compressed air to flow out of the valve chamber by way of the outlet and a closed position in which the control valve is in contact with the control valve seating surface to prevent compressed air from flowing out of the outlet of the valve chamber, and a vlave member which is freely displaceable within the circular cylindrical portion of the valve housing based on the pressure within the valve chamber, the valve member being a piston which is movable between a closing position in which the piston is adapted to engage the valve seat to prevent the flow of compressed air into the pressure tube when the control valve is in the closed position and an opening position in which the piston is adapted to be spaced from the valve seat to permit the flow of compressed air into the pressure tube when the control valve is in the open position to clean said filtering elements, said piston being surrounded by and guided solely by the circular cylindrical portion of the valve housing as the piston moves between the closing and opening positions, said valve chamber having an inlet through which compressed air flows into the valve chamber, said inlet of the valve chamber being defined by an annular gap between the piston and the circular cylindrical portion of the valve housing which communicates air pressure into said valve chamber to maintain the valve member in the closing position when the control valve is in the closed position.

2. Valve arrangement according to claim 1, wherein said piston which comprises said valve member is movable in an axial direction, the circular cylindrical portion of the valve housing extending in the axial direction to such an extent that the circular cylindrical portion surrounds substantially the entire piston when the piston is in the closing position.

3. Valve arrangement according to claim 2, including pressure-medium ports provided at a free end of the circular cylindrical portion of the valve housing.

4. Valve arrangement according to claim 1, wherein said control valve seating surface is a recess in an upper region of the valve housing, said flexible disc being seated on the recess when the control valve is in the closed position and being moved upwardly out of engagement with the recess when the control valve is in the open position.

5. Valve arrangement according to claim 4, wherein said flexible disc includes a through hole communicating the valve chamber with a space located above the flexible disc.

6. Valve arrangement according to claim 4, wherein said valve housing including an upper part and a lower part, said recess being provided on an upper side of the lower part.

7. Valve arrangement according to claim 6, wherein an underside of said upper part which faces said flexible disc is provided with a recess.

8. Valve arrangement according to claim 7, including a through bore provided in the upper part.

9. Valve arrangement according to claim 1 wherein said valve housing includes an annular abutment disposed adjacent an upper region of the circular cylindrical portion, and including a first washer engaging the abutment, said first washer being held in place by a second washer that is positioned in an annular groove formed in an inner wall of the circular cylindrical portion, said first and second washers forming a damping unit that is engaged by the piston when the piston moves to the operating position.

10. Valve arrangement according to claim 9, wherein said second washer includes an underside which faces towards the piston, said underside being provided with a plurality of radially disposed grooves that provide communication between the valve chamber and the inlet when the piston is in the opening position.

11. Valve arrangement according to claim 1, wherein said piston is made of glass fiber reinforced plastic.

12. Valve arrangement according to claim 1, wherein said control valve is disposed within said control valve housing.

13. Valve arrangement according to claim 12, wherein said control valve housing includes an upper part and a lower part, said control valve being disposed between said upper part and said lower part of said control valve housing.

* * * * *